United States Patent [19]
Takahashi et al.

[11] Patent Number: 6,035,821
[45] Date of Patent: Mar. 14, 2000

[54] CAM SHAFT FOR ENGINE

[75] Inventors: Hironao Takahashi; Masaki Yoshikawa, both of Iwata, Japan

[73] Assignee: Yamaha Hatsudoki Kabushiki Kaisha, Japan

[21] Appl. No.: 09/110,540

[22] Filed: Jul. 6, 1998

[30] Foreign Application Priority Data

Jul. 3, 1997 [JP] Japan ..................... 9-193153

[51] Int. Cl.[7] ..................... F01L 1/08
[52] U.S. Cl. ............ 123/192.2; 123/90.6; 74/567
[58] Field of Search ............ 74/567; 123/192.1, 123/192.2, 90.6

[56] References Cited

U.S. PATENT DOCUMENTS

| | | | |
|---|---|---|---|
| 3,574,304 | 4/1971 | Santi | 123/90.28 |
| 3,882,832 | 5/1975 | Ohsaki et al. | 123/90.6 |
| 4,681,065 | 7/1987 | Honma | 123/90.27 |
| 4,995,353 | 2/1991 | Stegeman et al. | 123/90.48 |
| 5,085,099 | 2/1992 | Hughes | 74/567 |
| 5,694,897 | 12/1997 | Reatherford | 123/90.6 |

*Primary Examiner*—Noah P. Kamen
*Assistant Examiner*—Hai Huynh
*Attorney, Agent, or Firm*—Knobbe, Martens, Olson & Bear, LLP

[57] ABSTRACT

Two embodiments of overhead camshaft internal combustion engines wherein the camshafts are provided with cut-outs in the area adjacent the cam lobes so as to keep the center of gravity in the lobed area closer to the rotational axis of the camshaft and also to improve balance and reduce vibration.

7 Claims, 9 Drawing Sheets

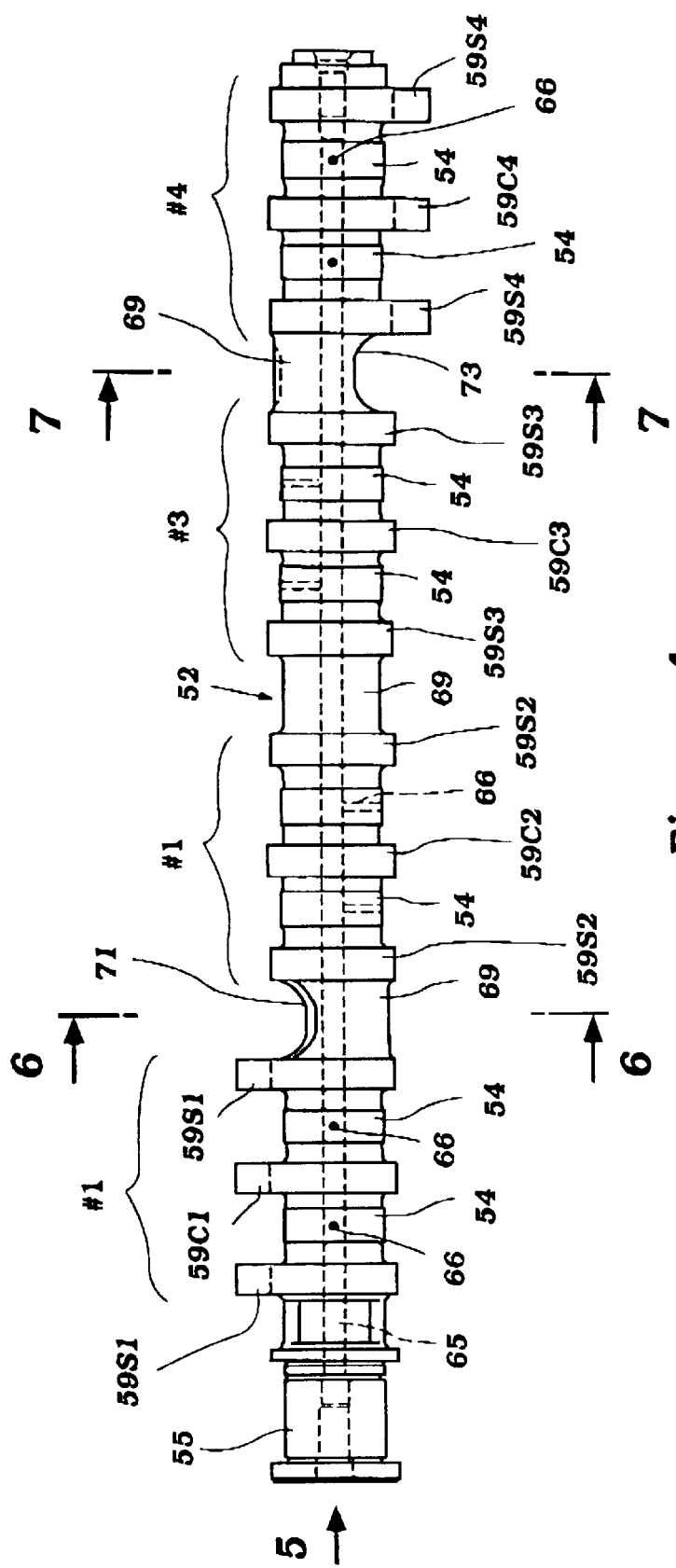
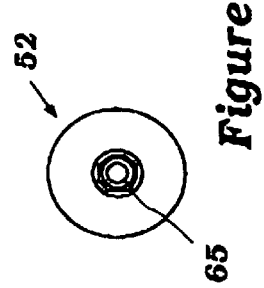
Figure 4
Figure 5

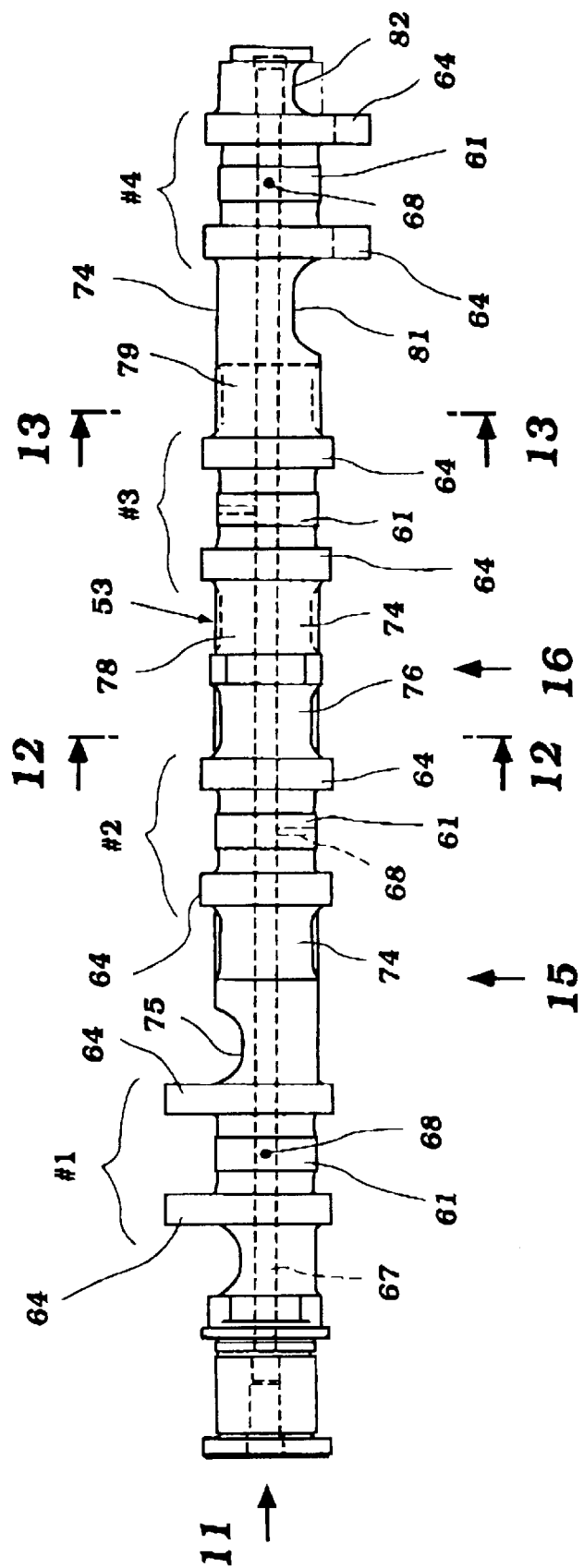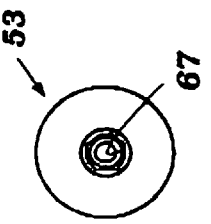
Figure 10
Figure 11

CAM SHAFT FOR ENGINE

BACKGROUND OF THE INVENTION

This invention relates to an internal combustion and more particularly to an improved camshaft arrangement for such engine.

As is well known, four cycle internal combustion engines have a valve actuating mechanism for the poppet valves that serve each of the combustion chambers. These camshafts are journaled in an engine body for rotation about an axis that is generally parallel to the crankshaft axis and which is driven at one half crankshaft speed. The camshaft has individual cam lobes that are associated with the actuated valves and which operate the valves through a suitable mechanism. This may include push rods and rocker arms or direct action, for example, via thimble tappets.

In either event, the construction of the camshaft generally is comprised of a cylindrical main body and a plurality of individual cam lobes for the purpose aforenoted. The inherent construction of the cam lobes, however, gives rise to its certain unbalances in the camshaft. That is, the cam lobes are not always symmetrically placed and thus may present off center masses that can cause out of balance forces that can cause vibration.

It is, therefore, a principle object of this invention to provide an improved camshaft construction for an engine.

It is a further object of this invention to provide a more balanced camshaft for operating the valves in an internal combustion engine.

The cam shaft has, in addition to its lobes, a main body portion from which the lobes protrude and also bearing areas along its length for the rotational support in the associated engine body. Normally the main body portion has an outer diameter that is uniform between the lobes and bearing areas. This main body portion is only slightly smaller in diameter than that of the bearing areas. Thus the cam shaft has substantial mass. This is undesirable for several reasons.

It is, therefore, a still further object of this invention to provide a lighter weight, balanced camshaft for an internal combustion engine.

SUMMARY OF THE INVENTION

This invention is embodied in a camshaft for operating the valves of an internal combustion engine. The camshaft has a main body having bearing portions that are journaled in the engine for rotation of the camshaft about a longitudinally extending axis. The camshaft is formed with at least one cam lobe which is associated with an associated valve for actuating the valve. The camshaft is formed with a portion contiguous to the cam lobe that is relieved so as to at least partially compensate for the unbalanced mass caused by the cam lobe.

BRIEF DESCRIPTION OF THE DRAWINGS

FIG. 4 is a top plan view of the intake camshaft removed from the engine and shown in the same rotational position as shown in FIG. 3.

FIG. 5 is an end view of the camshaft looking in the direction of the arrow 5 in FIG. 4 but showing only the end construction of the camshaft.

FIG. 10 is a top plan view, in part similar to FIG. 4, but illustrates the exhaust camshaft in the same angular position as it appears in FIG. 3.

FIG. 11 is an end elevational view of the exhaust camshaft looking in the direction of the arrow 11 in FIG. 10.

DETAILED DESCRIPTION OF THE PREFERRED EMBODIMENTS

Figure 1:
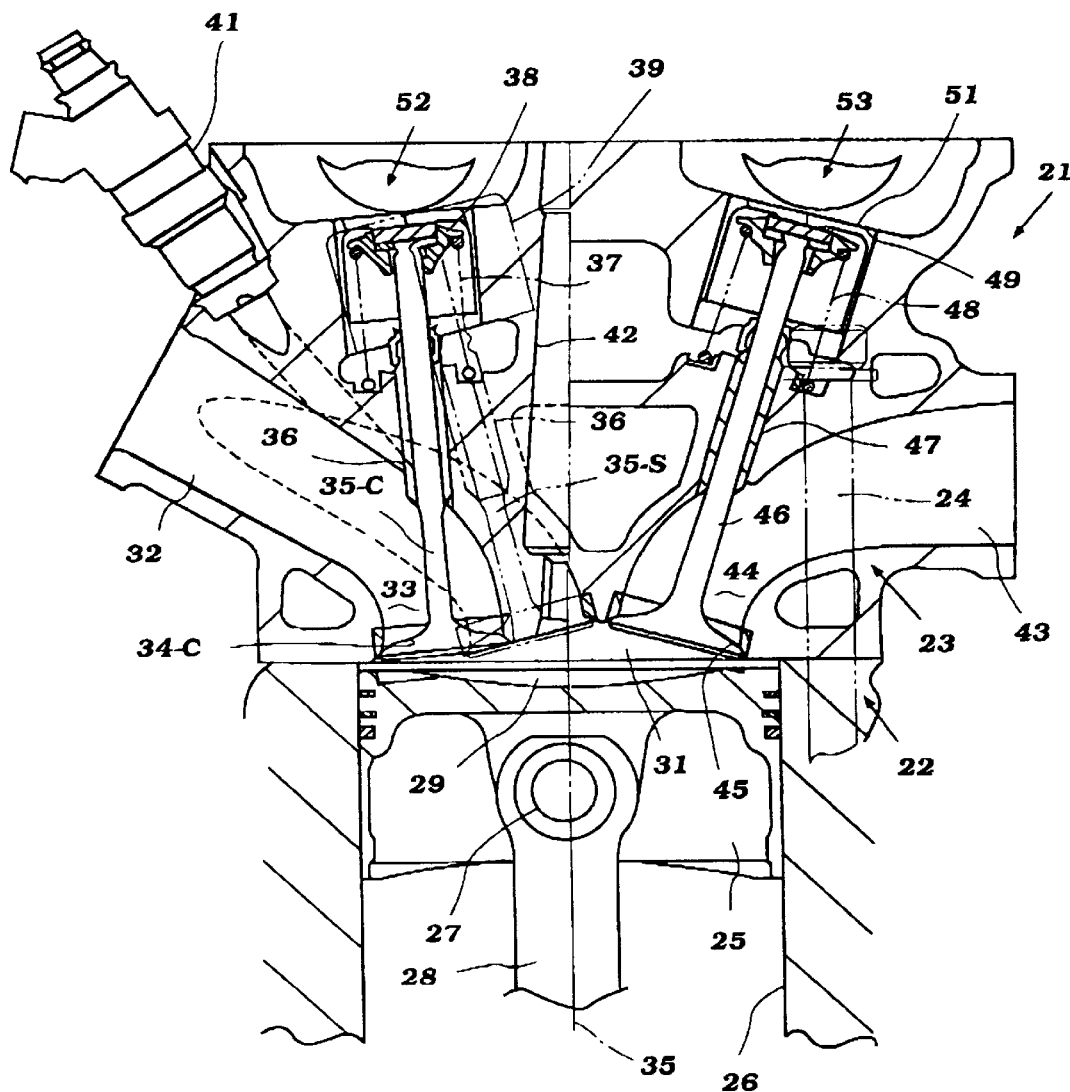
FIG. 1 is a partial cross-sectional view taken through the upper portion of an internal combustion engine constructed in accordance with an embodiment of the invention and taken generally through the axis of one of the cylinder bores of the engine.
Figure 2:
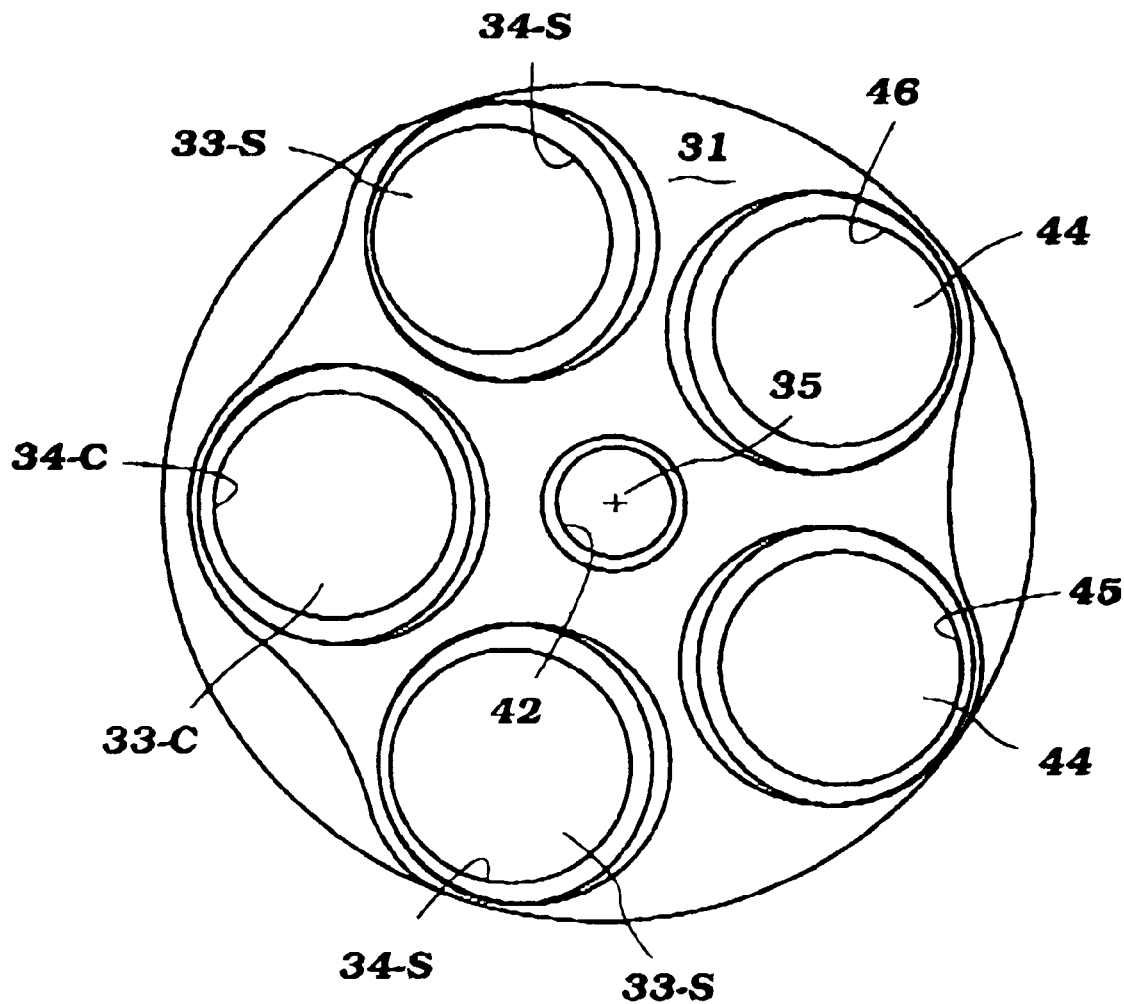
FIG. 2 is a partial bottom plan view of the cylinder head.
Figure 3:
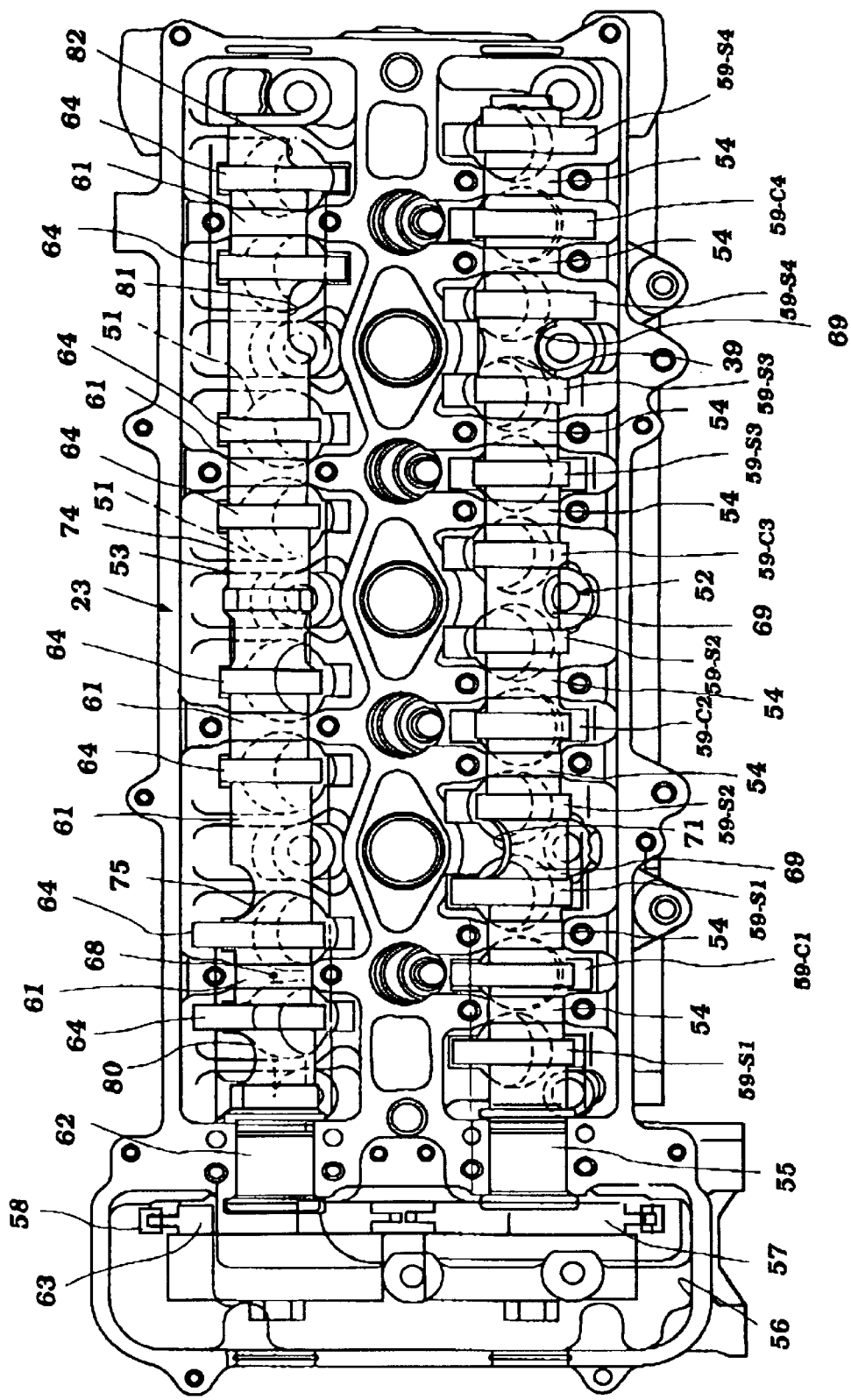
FIG. 3 is a top plan view of the cylinder head of the engine with the cam cover removed so as to show the valve actuating mechanism and with the valves and their valve actuating tappets removed from the cylinder head so as to more clearly show the construction.

Referring now in detail to the drawings and initially to the first embodiment and particularly to FIGS. 1 through 3, a portion of an internal combustion engine is illustrated and is identified generally by the reference numeral 21. Since the invention deals primarily with the construction of the camshafts, and particularly those utilized in overhead cam engines, only the upper portion of an engine is illustrated and generally only a single cylinder is shown in cross-section in FIG. 1. Those skilled in the art will readily understand how to practice the invention with any type of engine from the following description. Thus, where any components of the engine 21 are not illustrated or described, any known construction may be utilized.

The engine 21 includes a cylinder block 22 which has affixed to it a cylinder head 23. The cylinder head 23 is affixed to the cylinder block 22 by a plurality of threaded fasteners 24.

Pistons 25 reciprocates in the cylinder bores 26 of the engine 21. In the illustrated embodiment, the engine 21 is illustrated as being of the inline, four cylinder type. It will be readily apparent to those skilled in the art, however, how the invention can be utilized with engines having varying cylinder numbers and varying configurations. For example, even though the engine 21 is depicted as being as an inline type engine, the drawings may also illustrate one bank of a V-type engine. Other types of modifications in cylinder number and cylinder placement will be obvious to those skilled in the art.

Each piston 25 is connected by means of a respective piston pin 27 to a connecting rod 28. The connecting rods 28 are journaled on a crankshaft which is not shown for the aforenoted reason.

The head of the piston 25 is provided with a small bowl area 29 that faces a recess 31 formed in the lower surface of the cylinder head 23 which is in confronting relationship to the cylinder bore 26. These components co-act to form the combustion chambers of the engine 21.

An intake passage arrangement, indicated generally by the reference numeral 32, is formed on one side of the cylinder head 23 for supplying a charge to each of the combustion chambers through the cylinder head recesses 31. A suitable induction system (not shown) may be attached to this cylinder head intake passage arrangement 32 for supplying an air charge thereto.

Although the shape of the intake passage arrangement 32 may be of any known type, a Siamese type passage arrangement is depicted. This terminates in three intake ports 33 which are defined primarily by valve seats 34.

As may be best seen in FIG. 2, the intake port 33 and valve seats 34 lie substantially on one side of a plane that extends longitudinally of the engine and which contains the cylinder bore axis 35. These ports and valve seats 33 and 34 are disposed so that one is further from this plane and disposed between the remaining ones. This is identified as the center intake port and center intake passage and are designated as 33C and 34C, respectively. The remaining ports and seats are disposed closer to the plane. These are referred to as side ports and seats, and thus their reference numerals are indicated by the suffix S, i.e. 33S and 34S, respectively.

Poppet type intake valves 35, having the same orientation configuration suffix, are mounted in the cylinder head 23 for reciprocation by respective valve guides 36. These valves are urged to their closed positions by coil compression spring assemblies 37 held in place by keeper retainer assemblies 38. Thimble tappets 39 are slidably supported in the cylinder head 23 and are operated by a camshaft mechanism to open the valves 35 as will be described later.

It has been already noted that an air charge is supplied to the intake passage arrangement 32 by an induction system. In this particular embodiment, a fuel injector 41 is mounted in the cylinder head adjacent each intake passage arrangement 32. The fuel injector 41 sprays directly into the intake passage arrangement toward the ports 33. The fuel injector 41 may be of the electric solenoid operated type. Obviously, however, other charge forming systems may be employed.

Spark plugs are mounted in spark plug receiving openings 42 formed in the cylinder head 23. These spark plug receiving openings 42 are disposed so that the gap of the spark plug will be disposed substantially on the cylinder bore axis 35. The spark plugs are fired by an appropriate ignition system for burning the charge which has been formed in the combustion chamber through the induction and charge forming system thus far described.

The burnt charge is discharged from the combustion chamber through an exhaust passage arrangement, indicated generally by the reference numeral 43. This exhaust passage arrangement 43 begins at a pair of exhaust ports 44 that are formed in the cylinder head recess 31 and which are delimited by exhaust valve seats 45 formed in any known manner. An exhaust system (not shown) cooperates with the cylinder head exhaust passage arrangements 43 for collecting the exhaust gases and discharging them to the atmosphere.

Poppet type exhaust valves 46 are slidably supported in the cylinder head 23 by valve guides 47. These exhaust valves 46 are urged to their closed position by coil compression spring assemblies 48. The spring assemblies 48 cooperate with keeper retainer assemblies 49 on the stems of the valves 48 to achieve their closure. Thimble type tappets 51 are mounted in the cylinder head 23 and cooperate with the exhaust valves 46 for opening them.

The mechanism for operating the exhaust valves 46 and the intake valves 35 will now be described in more detail, and initially by primary reference to FIG. 3. An intake camshaft, indicated generally by the reference numeral 52, is associated with the thimble tappets 39 that operate the intake valves 35. In a like manner, an exhaust camshaft 53 is mounted in the cylinder head assembly 23 and cooperates with the thimble tappets 51 for operating the exhaust valves 46.

The intake camshaft 52 is formed with spaced intermediate bearing portions 54 positioned along its length and which are formed primarily in a main body portion of the intake camshaft 52. These bearing portions 54 are journaled in bearing surfaces formed integrally with the cylinder head 23 and by bearing caps (not shown) detachably affixed thereto. In addition, the intake camshaft 52 has an end bearing portion 55 that is journaled in a larger bearing surface formed integrally in the cylinder head and adjacent a timing chain cavity 56 formed therein. A further bearing cap which is also not shown cooperates with this cylinder head bearing surface for supporting the intake camshaft bearing portion 54.

A timing sprocket 57 is affixed to the intake camshaft bearing portion 55 in the timing chain cavity 56 in a suitable manner. A timing chain 58 is engaged with this sprocket and drives it and the intake camshaft 52 at one half crankshaft speed. The timing chain 58 is driven from the crankshaft of the engine in a known manner.

The intake camshaft 52 has three intake cam lobes 59, each associated with a respective cylinder bore 26 for operating the three intake valves 36 associated therewith. For ease of understanding, these cam lobes are also designated by the suffix "S" when they operate the side intake valve or "C" when they operate the center intake valve for the respective cylinder. For a reason which will also be described, those associated with the respective cylinders 1, 2, 3 and 4, beginning numbering from the cam chain cavity 56 also appears in the designation of the respective cam lobe portions 59. That is, the center intake cam lobe for cylinder #1 is designated, 59C1, etc.

Like the intake camshaft 52, the exhaust camshaft 53 has a main body portion that is formed with space bearing surfaces 61. These bearing surfaces 61 are journaled in cooperating, machined bearing surfaces formed in the cylinder head 23 and bearing cap (not shown) affixed to the cylinder head 23 for journaling the exhaust camshaft 53 for rotation about its longitudinally extending axis. In addition, an end bearing portion 62 is formed at one end of the exhaust camshaft 53 and is journaled in a corresponding bearing surface formed in the cylinder head 23 and a bearing cap (not shown) affixed thereto.

A sprocket 63 is affixed to the exhaust camshaft bearing portion 62. The sprocket 63 like the sprocket 57 is driven from the timing chain 58. It should be noted that variable valve timing mechanisms may be interconnected between either or both of the sprockets 57 and 63 and their respective driven camshafts 52 and 53.

The exhaust camshaft 53 has exhaust cam lobes 64, each of which is associated with a respective one of the exhaust valve thimble tappets 51 for operating them in a well known manner.

The construction of the intake camshaft 52 and the exhaust camshaft 53 will now be described in more detail by reference to the remaining figures of this embodiment (FIGS. 4–16).

The intake camshaft 52 which is shown in more full detail in FIGS. 4 through 9 will be described first. As is typical in the practice, the intake camshaft 52 is provided with a longitudinally extending drilled oil passage 65 which is adapted to communicate with a suitable source of lubricant under pressure. The bearing portions 54 are each cross-drilled as at 66 so that lubricant can flow from the longitudinal passage 65 to the various bearing surfaces of the camshaft 52 and specifically the surfaces 54 for their lubrication.

Referring now to the exhaust camshaft, as shown in FIGS. 10 through 16, it also is provided with a longitudinally extending drilled oil passage 67 which also communicates with a source of lubricant under pressure. Each of the bearing surfaces 61 is provided with a cross-drilling 68 so that lubricant can flow from the interior of the camshaft 53 to the bearing surfaces for the exhaust camshaft 53 for their lubrication.

Referring now primarily to the intake camshaft 52, as seen in FIGS. 4 through 9, the engine is depicted as having a firing order of 1, 2, 4, 3. Thus, the cam lobes 59 associated with each cylinder 59-1, 59-2, 59-4, and 59-3, are spaced from each other circumferentially around the axis "o" of rotation of the intake camshaft 52 by 90 z,900 from each other. This is to provide equal firing impulses.

However, the construction is also such that the side intake valves 35S open and close slightly in advance of the center intake valve 35C. Hence, the side intake cam lobes 59S-1, 59S-2, 59S-4, and 59S-3, are advanced slightly relative to the center intake cam lobes 59C-1, 59C-2, 59C-4, and 59C-3. This advance angle is indicated by the angle Θ in FIGS. 6 and 7. This results in peak lift point J for the side intake cam lobes 59S being advanced by this angle from the peak lift point H of the center intake cam lobes 59C. This is done to achieve the desired flow pattern in the combustion chambers.

The construction as thus far described for both intake and exhaust camshafts 52 and 53, respectively, may be considered to be conventional. With such arrangements, however, the portion of the camshaft and specifically the portions 69 between the cam lobes 59 associated with the cylinders 1, 2, 3 and 4, are generally cylindrical and have generally the same diameter as the remainder of the body of the camshaft 52 between the lobes 59 and bearing surfaces 54.

This has two disadvantageous results. First, it results in a heavier camshaft than necessary. Second, the eccentric weight resulting from the lobes of the cam 69 can cause some vibration and unbalance. Thus, in accordance with the invention, the areas in the camshaft portions 69 between #1 and #2 cylinders and between #3 and #4 cylinders are provided with cutouts so as to reduce the weight. These cutouts are also formed in the circumferential area where the cam lobes 59 expend so as to reduce the amount of unbalance.

Figure 6:
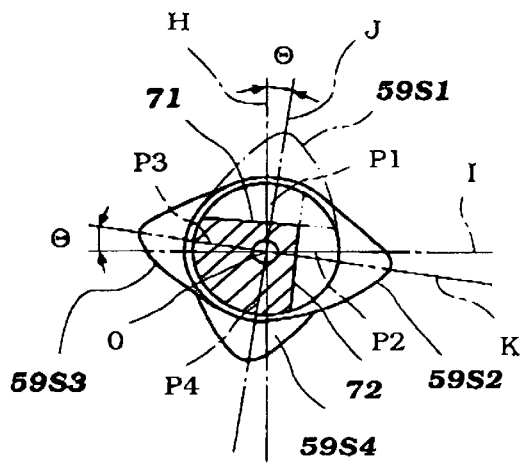
FIG. 6 is a cross-sectional view taken along the line 6—6 of FIG. 4.

Thus, as seen thus in FIGS. 4 and 6, the area between the cam lobes 59 of cylinders 1 and 2 is provided with a first cutout portion 71 which is disposed in the area adjacent the cam lobes 59S1 and 59C1 so as to reduce the weight on this side in an amount somewhat equal to the weight of eccentricity of the lobes 59. Thus, the center of gravity P1 is maintained closely to the camshaft axis O than were the cutouts not provided.

In a similar manner, a cutout 72 is provided in the area where the cam lobes 59S2 and 59C2 are for the same effect. This moves the center of gravity P-2 closer to the camshaft axis O.

Figure 7:
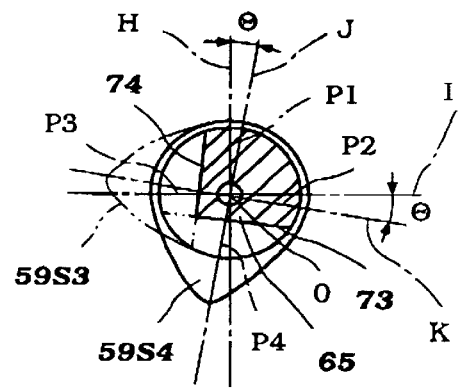
FIG. 7 is a cross-sectional view taken along the line 7—7 of FIG. 4.
Figure 8:
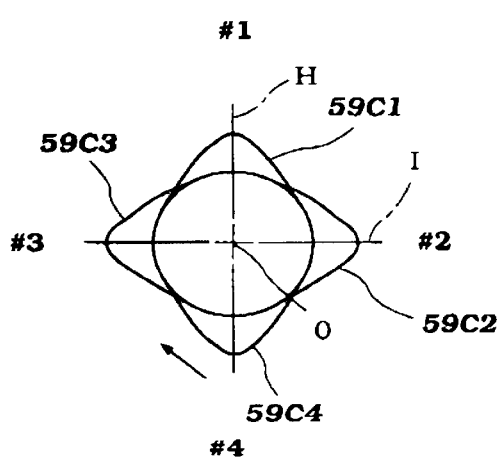
FIG. 8 is an end elevational view of the camshaft showing the configuration of the camshaft lobes associated with the intake camshaft and which operate the center intake valve for each cylinder.
Figure 9:
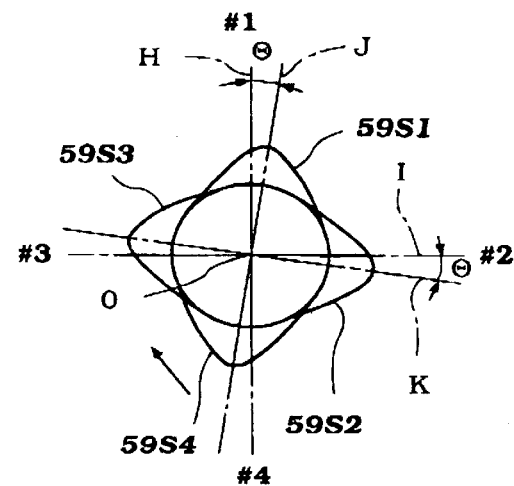
FIG. 9 is a view, in part similar to FIG. 8, but shows the location of the cam lobes that operate the side intake valve for each cylinder.
Figure 12:
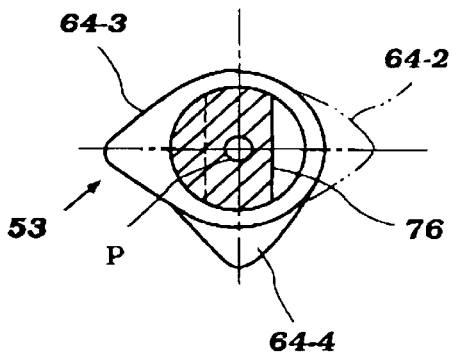
FIG. 12 is a cross-sectional view taken along the line 12—12 of FIG. 10.
Figure 13:
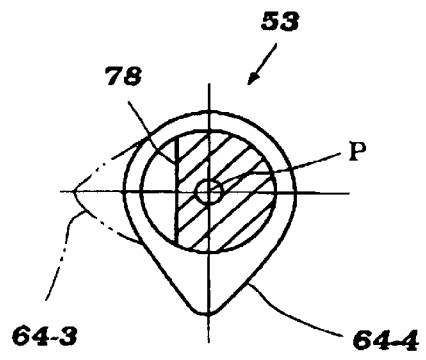
FIG. 13 is a cross-sectional view taken along the line 13—13 of FIG. 10.
Figure 14:
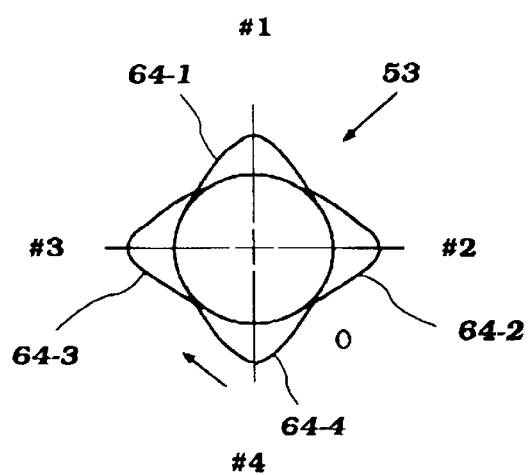
FIG. 14 is a view, in part similar to FIGS. 8 and 9, but shows the cam lobes for operating the exhaust valve.
Figure 15:
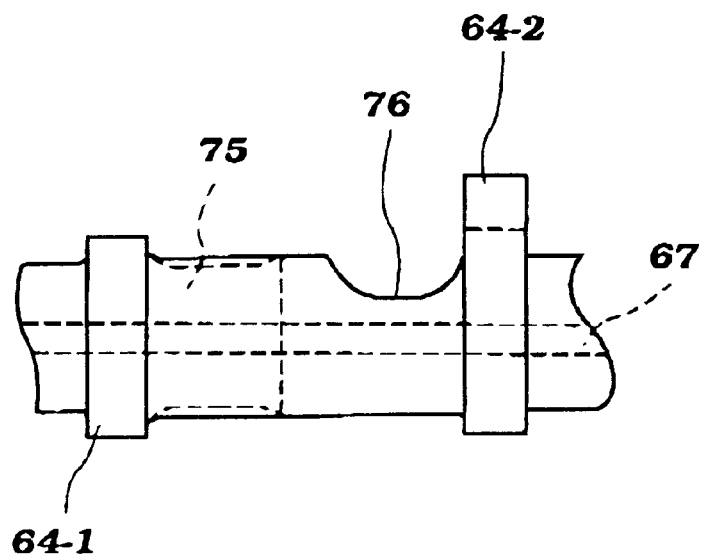
FIG. 15 is a partial view looking in the direction of the arrow 15 in FIG. 10.
Figure 16:
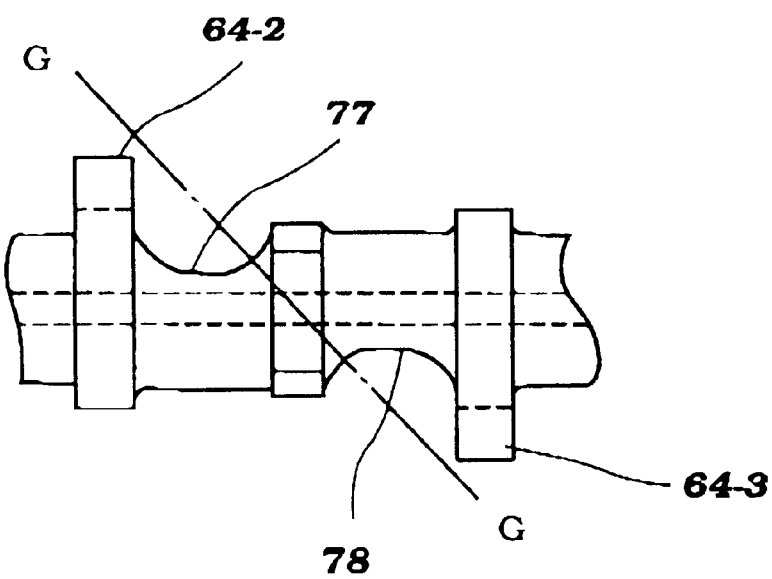
FIG. 16 is a partial view looking in the direction of the arrow 16 in FIG. 10.

In a similar manner and as best seen in FIG. 7, the camshaft portion 69 between the #3 and #4 cylinders is provided with a first cutout 73 that is in the area where the cam lobes 59S4 and 59C4 are formed so as to move the center of gravity P3 closer to the intake camshaft axis O. In a lie manner, the camshaft portion 69 between these two cylinders 3 and 4 is provided with a further cutout 74 in the area where the cam lobes 59S3 and 59C3 are located so as to move the center of gravity P3 closer to the camshaft axis O. Thus, this construction has the effect of lightening the camshaft without sacrificing its weight and also to reduce vibration and balance the weight of the camshaft better.

A similar lightening and balancing arrangement is employed in conjunction with the exhaust camshaft 53. This will now be described by reference to FIGS. 10 through 16. Like the intake camshaft 52, the exhaust camshaft is provided with intermediate base portions 74 that extend between the adjacent cylinders 1 and 2, 2 and 3, and 3 and 4. These base portions 74 normally would have a diameter equivalent to the diameter of the base of the camshaft throughout its length. It should be noted that the portions 74 are longer than the corresponding portions 69 between the intake camshaft cylinders because of the fact that there are a lesser number of cam lobes for operating the exhaust valve.

The portion 74 between the #1 and #2 cylinders is provided with two cutouts, one indicated at 75 that is disposed in the area where the cam lobes 64 of the #1 cylinder are positioned, and another cutout 76 (FIG. 15) in the area where the cam lobes 64-2 of cylinder #2 are located. These have exactly the same effect as the previously described embodiments so as to locate the center of gravity as closer to the axis of rotation P of the exhaust camshaft.

The area 74 between #2 and #3 cylinders is also provided with a first cutout 77 adjacent the cam lobes 64-2 and a second cutout 78 located adjacent the cam lobes 64-3 so as to provide the same type of balancing effect.

Additionally, the portion 74 between the #3 and #4 cylinders is provided with a first cutout 79 adjacent to cam lobes 64-3 and a second cutout 81 adjacent to cam lobes 64-4. A like cut out 82 is formed at the end of the exhaust camshaft 53 spaced from its drive sprocket 63 Thus, like the intake camshaft 52, the exhaust camshaft 53 will be better balanced and lighter in weight.

Figure 17:
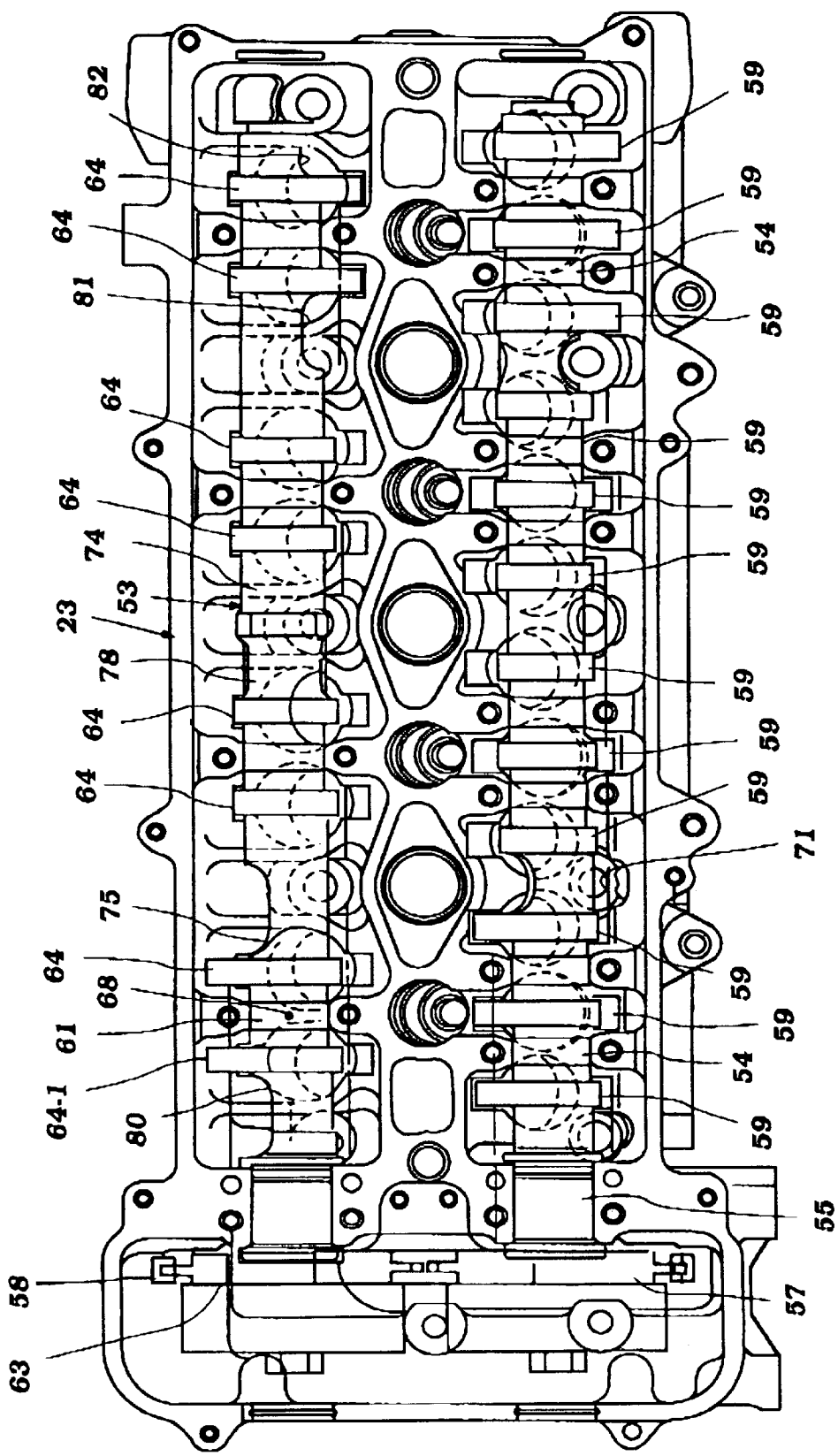
FIG. 17 is a top plan view, in part similar to FIG. 3, showing another embodiment of the invention.

Of course, the size and locations of the cutouts and specifically the variations between the depth and their axial length can be varied so as to vary the amount of shifting of the center of gravity. For example, FIG. 17 shows another embodiment which is quite similar to that previously described and differs only in the length and depth of the various cutouts.

Thus, from the foregoing description, it should be readily apparent that the embodiments described provide a lighter weight camshaft arrangement and one which provides better balance and vibration reduction without sacrificing weight. Of course, the foregoing description is that of preferred embodiment of the invention and various changes and modifications may be made without departing from the spirit and scope of the invention, defined by the appended claims.

We claim:

1. A camshaft for operating the valves of an internal combustion engine, said camshaft having a main body having bearing portions that are journaled in a body of the engine for rotation of said camshaft about a longitudinally extending axis, at least one cam lobe formed on said camshaft and associated with a valve for actuating the valve, and a relieved portion formed in said camshaft on the same side of said axis as and contiguous to said cam lobe so as to at least partially compensate for the unbalanced mass caused by said cam lobe by reducing the mass of said camshaft on said same side.

2. A camshaft as set forth in claim 1 wherein the camshaft operates the valves of multiple cylinders and there is at least one cam lobe formed on said camshaft for each cylinder and a relieved portion contiguous to the lobe for each cylinder.

3. A camshaft as set forth in claim 2 wherein the camshaft has plural lobes for each cylinder.

4. A camshaft as set forth in claim 3 wherein the cam lobes for the cylinders are circumferentially spaced from each other around the camshaft axis.

5. A camshaft as set forth in claim 4 wherein the camshaft relieved portions are also circumferentially spaced from each other around the camshaft axis.

6. A camshaft as set forth in claim 5 wherein the camshaft relieved portions between two adjacent cylinders form a single continuous relief in the same circumferential area.

7. A camshaft as set forth in claim 5 wherein the camshaft relieved portions between two adjacent cylinders form two axially and circumferentially spaced reliefs.

* * * * *